(12) United States Patent
Tamosevicius et al.

(10) Patent No.: US 9,059,860 B2
(45) Date of Patent: Jun. 16, 2015

(54) TECHNIQUES FOR ANNOUNCING CONFERENCE ATTENDANCE CHANGES IN MULTIPLE LANGUAGES

(75) Inventors: Rokas Tamosevicius, Zurich (CH); Tim Carr, Zurich (CH); Elia Noris, Zurich (CH); Vlad Eminovici, Zurich (CH)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 918 days.

(21) Appl. No.: 13/021,314

(22) Filed: Feb. 4, 2011

(65) Prior Publication Data
US 2012/0203538 A1 Aug. 9, 2012

(51) Int. Cl.
| | |
|---|---|
| *H04M 3/42* | (2006.01) |
| *H04M 3/56* | (2006.01) |
| *H04L 12/18* | (2006.01) |
| *H04L 29/06* | (2006.01) |

(52) U.S. Cl.
CPC ... *H04L 12/1822* (2013.01); *H04M 2203/5009* (2013.01); *H04L 12/1827* (2013.01); *H04M 3/56* (2013.01); *H04M 2201/22* (2013.01); *H04M 2203/5081* (2013.01); *H04L 65/1006* (2013.01); *H04L 65/1053* (2013.01); *H04L 65/4038* (2013.01)

(58) Field of Classification Search
CPC .......... H04M 3/56; H04M 2203/5081; H04M 2203/5009; H04M 3/563
USPC ....................... 379/202.01–206.01
See application file for complete search history.

(56) References Cited

U.S. PATENT DOCUMENTS

| | | | |
|---|---|---|---|
| 5,619,555 | A | 4/1997 | Fenton et al. |
| 5,719,928 | A | 2/1998 | Pinnell et al. |
| 7,330,541 | B1 | 2/2008 | Surazski et al. |
| 7,881,447 | B1 * | 2/2011 | Satapathy et al. ........ 379/202.01 |
| 8,072,909 | B2 * | 12/2011 | Gierach et al. ................ 370/261 |
| 8,194,829 | B1 * | 6/2012 | Das et al. .................... 379/88.25 |
| 8,363,808 | B1 * | 1/2013 | Bland et al. ............. 379/202.01 |
| 8,542,812 | B2 * | 9/2013 | Danielsen ................ 379/202.01 |
| 2002/0087649 | A1 * | 7/2002 | Horvitz ........................ 709/207 |
| 2004/0117194 | A9 | 6/2004 | Lee et al. |
| 2004/0141605 | A1 | 7/2004 | Chen et al. |
| 2006/0067499 | A1 * | 3/2006 | Oliveira et al. .......... 379/202.01 |

(Continued)

OTHER PUBLICATIONS

"Cisco Unified MeetingPlace Release 8.0—MeetingPlace Conference Manager References", Retrieved at <<http://docwiki.cisco.com/wiki/Cisco_Unified_MeetingPlace_Release_8.0_—_MeetingPlace_Conference_Manager_References>>, Jul. 2, 2010, pp. 5.

(Continued)

*Primary Examiner* — Samuel G Neway
(74) *Attorney, Agent, or Firm* — Andrew Smith; Alin Corie; Micky Minhas

(57) ABSTRACT

Techniques for announcing conference attendance changes in multiple languages and in a minimally disruptive form are described. An embodiment may include batching announcement events for a time period. The time period may be specific, or may be determined by the length of an ongoing announcement. At the end of the batching time, an announcement of the batched events may be streamed to the conference participants. Multiple batched events may be summarized into one announcement. Multiple access points to a conference may be provided, where each access point provides announcements in a different language. Other embodiments are described and claimed.

18 Claims, 11 Drawing Sheets

(56) References Cited

U.S. PATENT DOCUMENTS

| | | |
|---|---|---|
| 2006/0080614 A1* | 4/2006 | Lentz .......................... 715/753 |
| 2006/0126821 A1 | 6/2006 | Sahashi |
| 2007/0156811 A1* | 7/2007 | Jain et al. ..................... 709/204 |
| 2009/0086948 A1* | 4/2009 | Narang et al. ........... 379/202.01 |
| 2009/0125295 A1* | 5/2009 | Drewes ........................... 704/3 |
| 2009/0187400 A1 | 7/2009 | Liu et al. |
| 2009/0204671 A1 | 8/2009 | Hawkins et al. |
| 2010/0149307 A1 | 6/2010 | Iyer et al. |
| 2012/0237011 A1* | 9/2012 | Gierach et al. ............ 379/93.01 |

OTHER PUBLICATIONS

Office Action received for Chinese Patent Application No. 201210024439.9, mailed Mar. 3, 2014, 13 pages including 5 pages English translation.

* cited by examiner

TECHNIQUES FOR ANNOUNCING CONFERENCE ATTENDANCE CHANGES IN MULTIPLE LANGUAGES

BACKGROUND

Conferencing systems allow multiple participants at different locations to communicate in real-time over a network. Conferencing systems typically announce the entry and exit of participants sequentially in an audio stream to all participants. When the announcements are spoken, they usually override the voices of any speakers. Visual announcements may clutter a display. This practice can be disruptive and lengthy, especially at the beginning of a conference event, when multiple participants join at about the same time. Further, the announcements are usually made in only one language.

It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques for announcing conference attendance changes in multiple languages. Some embodiments are particularly directed to techniques for announcing conference attendance changes in batched or shortened form. In one embodiment, for example, a technique may include batching announcement events for a time period. The time period may be specific, or may be determined by the length of an ongoing announcement. At the end of the batching time, an announcement of the batched events may be streamed to the conference participants. Multiple batched events may be summarized into one announcement. Multiple access points to a conference may be provided, where each access point provides announcements in a different language. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments may be generally directed to audio conferencing systems or multimedia conferencing systems arranged to provide meeting and collaboration services to multiple participants over a network. The embodiments are directed to techniques and systems for announcing attendance changes in a conference, in multiple languages, in a way that minimizes disruptions while still providing attendance change information. Embodiments may batch announcement events according to a time window, an announcement duration, or both. Batched announcement events may then be announced either as single events or as summaries of similar events. Embodiments may provide different announcement streams for different languages. As a result, the embodiments can improve the user experience in a conference by reducing disruptions from attendance change announcements and by providing information in the language of choice for a user.

Figure 1:
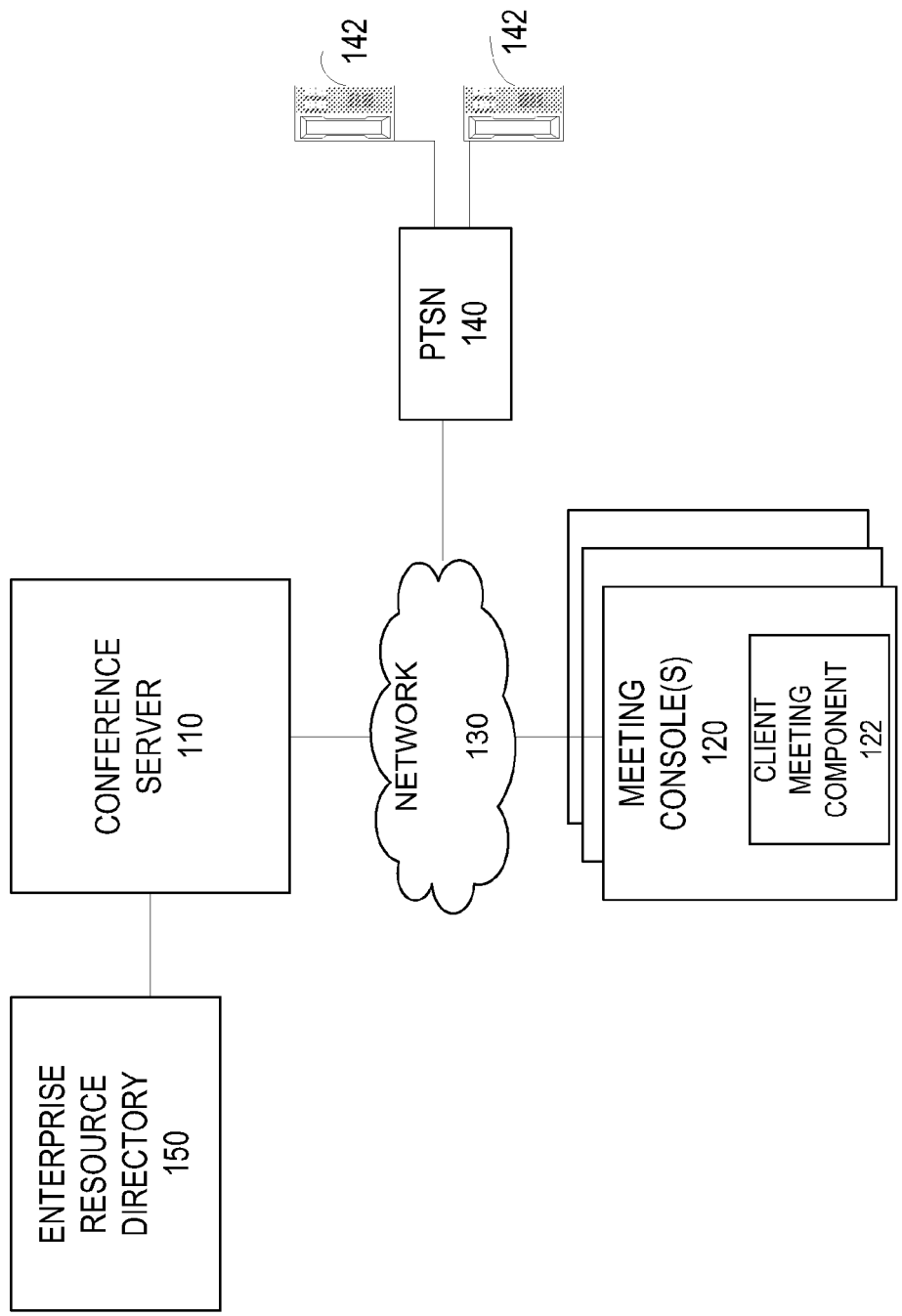
FIG. 1 illustrates an embodiment of a conferencing system.

FIG. 1 illustrates a block diagram for a system 100 to provide conferencing services. In one embodiment, for example, the system 100 may comprise a computer-implemented system having multiple components such as conference server 110, meeting consoles 120, and an enterprise resource directory 150. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented by one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components 110 and 120 may be communicatively coupled via various types of communications media, such as network 130. Network 130 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators).

In various embodiments, the system 100 may comprise conference server 110. Conference server 110 may comprise any logical or physical entity that is arranged to establish, manage and/or control a conference call between meeting consoles 120 over network 130. A particular implementation for conference server 110 may depend on a set of communication protocols or standards to be used for the conference server 110. In one example, conference server 110 may be implemented in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. In another example, conference server 110 may be implemented in accordance with the International Telecommunication Union (ITU) H.323 series of standards and/or variants. The H.323 standard defines a multipoint control unit (MCU) to coordinate conference call operations. In particular, the MCU includes a multipoint controller (MC) that handles H.245 signaling, and one or more multipoint processors (MP) to mix and process the data streams. Both the SIP and H.323 standards are essentially signaling protocols for Voice over Internet Protocol (VoIP) or Voice Over Packet (VOP) multimedia conference call operations. It may be appreciated that other signaling protocols may be implemented for conference server 110, however, and still fall within the scope of the embodiments.

In general operation, system 100 may be used for conference calls, including audio-only conference calls, audio/video conference calls, and multimedia conference calls. Multimedia conferencing calls may include communicating voice, video, and/or data information between multiple end points. Network 130 may also be connected to a Public Switched Telephone Network (PSTN) 140 via one or more suitable VoIP gateways arranged to convert between circuit-switched information from telephones 142 and packet information.

In various embodiments, conference server 110 may establish, manage and control a conference call between meeting consoles 120. In some embodiments, the conference call may comprise an audio-only conference, or a live web-based conference call that provides full collaboration capabilities. Conference server 110 may operate as a central server that controls and distributes media information in the conference. It may receive media information from various meeting consoles 120, perform mixing operations when there are multiple types of media information, and forward the media information to some or all of the other participants. The media information may include participant information, audio information, video information, document or presentation information, and so forth.

In various embodiments, the system 100 may comprise one or more meeting consoles 120. A meeting console 120 may be arranged to participate in a conference by connecting to conference server 110. The meeting consoles 120 may include respective client meeting components 122. The client meeting components 122 may be designed to interoperate with conference server 110 to establish, manage or control a conference event. For example, the client meeting components 122 may include the appropriate applications and user interface controls to allow the respective meeting consoles 120 to participate in a conference facilitated by conference server 110. This may include input equipment (e.g., video camera, microphone, keyboard, mouse, controller, etc.) to capture media information provided by the operator of a meeting console 120, and output equipment (e.g., display, speaker, etc.) to reproduce media information by the operators of other meeting consoles 120.

Participant information may be obtained from a meeting console 120 used to join the conference. For example, a participant typically uses a meeting console to join a virtual meeting room for a conference. Prior to joining, the participant may provide various types of identifying information to perform authentication operations with the conference server 110. Once conference server 110 authenticates the participant, the participant is allowed access to the virtual meeting room, and the conference server 110 may add the identifying information to a participant roster. When a participant is authenticated and joins the virtual meeting room, conference server 110 may create a join event for the conference.

In various embodiments, the system 100 may comprise an enterprise resource directory 150. Enterprise resource directory 150 may operate directory services to provide central authentication and authorization services for network computers. Enterprise resource directory 150 may include identifying information about individuals in an organization, including potential participants in a conference event. For example, the identifying information may include, without limitation, a name, a location, contact information, account numbers, professional information, organizational information (e.g., a title), personal information, connection information, presence information, a network address, a media access control (MAC) address, an Internet Protocol (IP) address, a telephone number, an email address, a protocol address (e.g., SIP address), equipment identifiers, hardware configurations, software configurations, wired interfaces, wireless interfaces, supported protocols, and other desired information.

In an embodiment, conference server 110 may receive reservations for conference events that include a list of potential participants. Conference server 110 may retrieve the corresponding identifying information for the potential participants from enterprise resource directory 150. Conference server 110 may use the list of potential participants and corresponding identifying information to assist in automatically identifying the participants to a conference event.

Figure 2:
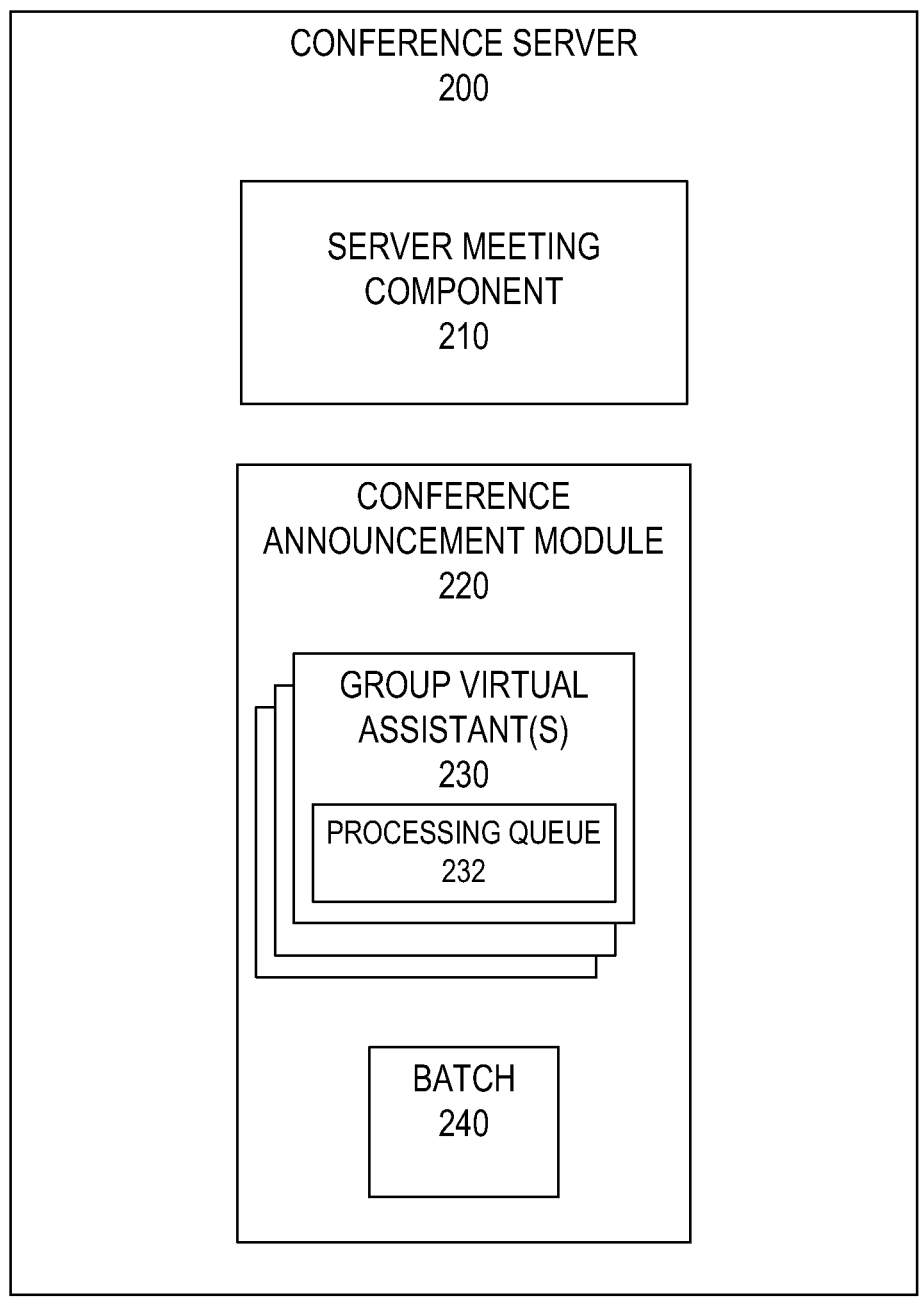
FIG. 2 illustrates an embodiment of a conference server.

FIG. 2 illustrates a block diagram of a conference server 200 to operate a conference service, and in particular to manage announcements events for a conference. Conference server 200 may be a representative embodiment of conference server 110. Conference server 200 may include one or more components, such as server meeting component 210 and conference announcement module 220. The functions of conference server 200 may be implemented with more or other components and are not limited to this example.

In various embodiments, conference server 200 may comprise server meeting component 210. Server meeting component 210 may be operative to establish, manage and/or control a conference event, including receiving and distributing media content, such as audio and video content, for a conference. Server meeting component 210 may further be operative to control and mix different types of media content for a meeting and collaboration event.

Server meeting component 210 may also receive connections from meeting consoles 120, authenticate the participant using the meeting console, and allow the participant to join a conference. Server meeting component 210 may also detect when a participant has exited a conference, for example, when a connection is dropped or the phone is hung up. Server meeting component 210 may generate announcement events related to participant attendance. An announcement event may include a join event, when a participant joins a conference, and an exit event when a participant exits a conference.

In various embodiments, conference server 200 may comprise conference announcement module 220. Conference announcement module (CAM) 220 may receive announcement events from server meeting component 210. CAM 220 may generate announcements relevant to a conference, and may insert the announcement into a media stream for the conference. In an embodiment, CAM 220 may insert an audio announcement for an announcement event into an audio stream. CAM 220 may insert a visual announcement, such as text or a graphic, into a video stream for an announcement event. CAM 220 may be a separate component from server meeting component 210, or may be a component of server meeting component 210.

CAM 220 may comprise one or more group virtual assistants (GVAs) 230. A GVA may receive an announcement event and generate an announcement. For example, when a GVA 230 receives an announcement event that Bill has joined a conference, GVA 230 may construct a spoken announcement that when streamed states "Bill is joining" in the audio stream. GVA 230 may construct a text message announcement that when streamed causes a display to show "Bill is joining." GVA 230 may retrieve a photo of Bill and insert an announcement into a video stream that causes the photo to be displayed with a text label of "joined." The embodiments are not limited to these examples.

CAM 220 may have a plurality of GVAs 230, where each GVA 230 makes announcements in a particular language. For example, one GVA may announce in English, while another may announce in Japanese. Server meeting component 210 may provide different access points for each GVA, so that a participant may select a GVA that provides announcements in the language of the participant's choice. The access points may be, for example, different telephone numbers, different Internet addresses, different network addresses, and so forth.

A GVA 230 may have its own processing queue 232. Processing queue 232 may be used to temporarily store announcement events while GVA 230 prepares an announcement for an event. As different languages take different amounts of time to say the same statement, having separate processing queues for each GVA may allow each GVA to process its queue of events at the pace appropriate for that language. In an embodiment, processing queue 232 may be a portion of a memory, or of batch 240, set aside for GVA 230.

CAM 220 may include a batch 240. Batch 240 may be a computer-readable storage medium that may be used to store announcement events from server meeting component 210. In an embodiment, batch 240 may be a faster access medium, such as random access memory or flash memory. In an embodiment, batch 240 may be logically arranged and used as a first-in-first-out (FIFO) queue. Other logical arrangements that preserve the order of the announcement events may also be used.

A GVA 230 may receive announcement events from batch 240 when a batch time frame is expired. In an embodiment, a batch time frame may be fixed, for example, three seconds long. In another embodiment, a batch time frame may last as long as an announcement is being streamed in a particular language. The batched events may be placed, in chronological order, into processing queue 232. GVA 230 may determine how many events are in the queue, and may select an announcement format accordingly. For example, if there is only one event, GVA 230 may announce the participant's name and the event, e.g. "Sam is joining." If there are multiple events, GVA 230 may summarize the events, e.g. "Four people are exiting." In an embodiment, GVA 230 may also check for repeated events in the processing queue, from a particular batch, and may suppress or remove the repeated events from being announced. A repeated event may include multiple announcement events for one participant in one batch. If a participant joins, exits, and joins in one batch time frame, then only the last join may be relevant, and only one announcement may be made related to that participant's activity.

The components of conference server 200 may coordinate operations between each other. The coordination may involve the uni-directional or bi-directional exchange of information. For instance, server meeting component 210 and conference announcement module 220 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Figure 3:
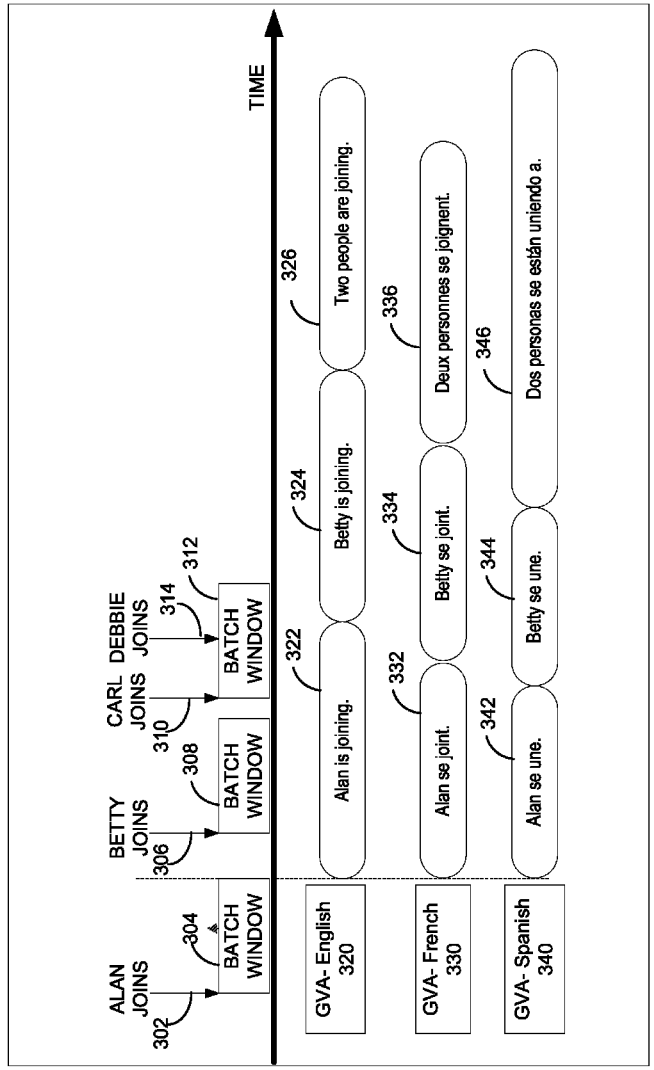
FIG. 3 illustrates a first example of a set of announcement events.

FIG. 3 illustrates a diagram 300 of an example of a series of announcement events for a conference according to an embodiment. In the example in FIG. 3, conference announcement module 220 may batch attendance changes according to a time window. Conference announcement module 220 may have three GVAs, for three different languages: GVA-English 320, GVA-French 330, and GVA-Spanish 340.

A new announcement event, such as an Alan joins event 302, begins a batch window 304. The batch window lasts for a specific period of time, e.g. for three seconds. All announcement events that take place during that batch window, including the first event, Alan joining event 302, are batched, for example, in batch 240. When the time for batch window 304 expires, the batched events may be passed to each GVA.

When batch window 304 expires, each GVA announces the batched events. In this example, there is only one batched event in batch window 304: Alan joins event 302. GVA-English 320 announces "Alan is joining." in announcement 322. GVA-French 330 announces "Alan se joint." in announcement 332. GVA-Spanish 340 announces "Alan se une." in announcement 342. While each announcement may take a different time to complete, each GVA conveys the same information to its receivers.

After batch window 304 expires, another announcement event occurs: Betty joins event 306. This begins a new batch window 308. When batch window 308 expires and when they finish their first announcements, the GVAs announce the batched events from batch window 308, in this case, Betty joins event 306. The GVAs announce event 306 in their respective languages in announcements 324, 334, and 344.

After batch window 308 expires, a new announcement event occurs: Carl joins event 310. This begins a new batch window 312. Before batch window 312 expires, another announcement event occurs: Debbie joins event 314. Debbie joins event 314 is added to the Carl joins event 310 in the batch for batch window 312.

When batch window 312 expires, the GVAs receive the events batched in the batch window 312. When there is more than one announcement event in a batch, the GVAs may summarize the batched events. In the embodiment shown in FIG. 3, the GVAs summarize the batched events as "Two people are joining." in announcements 326, 336, and 346.

Other embodiments may compare the number of events to a threshold and may announce each event individually if the number is below a threshold, such as two, and may summarize the events in a summary announcement if the number is at or above a threshold. Still other embodiments may announce a partial summary if the number is at a threshold and below a second threshold. For example, for two of the same kind of announcement events, such as 310 and 314, the summary announcement may be "Carl and Debbie are joining."

Figure 4:
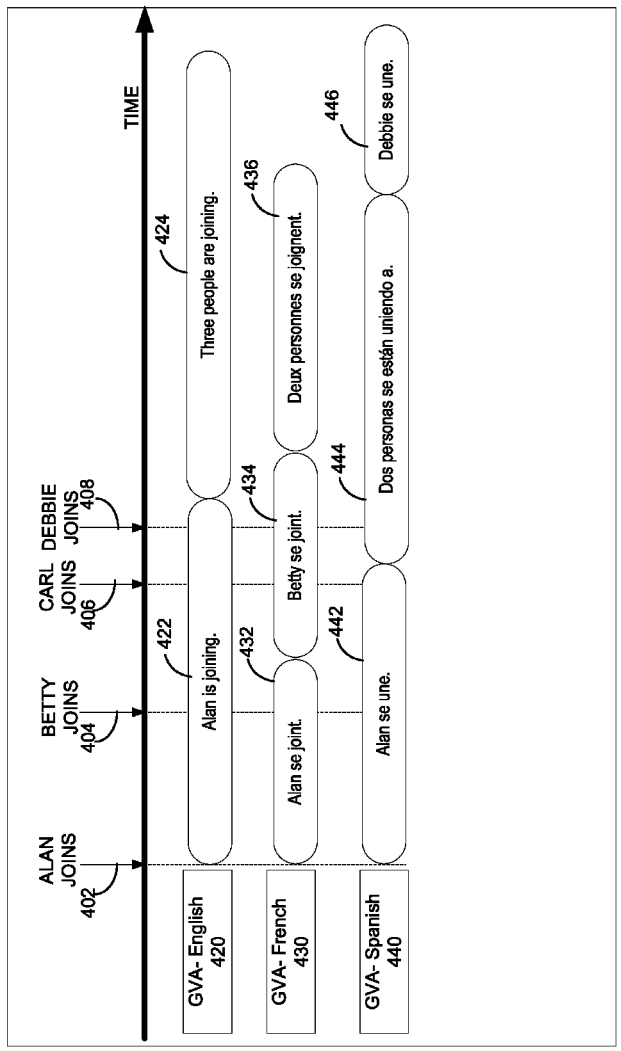
FIG. 4 illustrates a second example of a set of announcement events.

FIG. 4 illustrates a diagram 400 of an example of a series of announcement events for a conference according to an embodiment. In the example in FIG. 4, conference announcement module 220 may batch attendance changes while an announcement is taking place. Conference module 220 may have three GVAs, for three different languages: GVA-English 420, GVA-French 430, and GVA-Spanish 440. In an embodiment, conference announcement module 220 may maintain a separate portion within batch 240 for each GVA, or each GVA may have its own batch.

In the embodiment illustrated in FIG. 4, if a GVA is idle, then it will announce the first new announcement event immediately upon receipt. For example, when Alan joins event 402 takes place, each GVA announces it immediately in announcements 422, 432, and 442. Because announcements 422, 432, and 442 are in English, French, and Spanish, respectively, the announcements finish at different times.

While 422, 432, and 442 are taking place, subsequent announcement events are batched. For example, while GVA 420 is streaming announcement 422, Betty joins event 404, Carl joins event 406 and Debbie joins event 408 occur, and are batched. When GVA 420 finishes announcement 422, there are three events batched. GVA 420 may summarize the three events as "Three people are joining." announcement 424.

For GVA 430, the experience differs. Announcement 432 ends after Betty joins event 404, but before Carl joins event 406. At the end of announcement 432, therefore, GVA 430 announces only the Betty joins event 404 in announcement 434. Events 406 and 408 take place during announcement 434 and are batched. When announcement 434 ends, GVA 430 summarizes the events, in French, that two people are joining in announcement 436.

For GVA 440, announcement 442 ends later than announcement 432 but before announcement 422. At the end of announcement 442, there are two events batched: Betty joins event 404 and Carl joins event 406. GVA 440 summarizes the events, in Spanish, that two people are joining, in announcement 444. While announcement 444 is taking place, Debbie joins event 408 occurs and is batched. When announcement 444 finished, GVA 440 announces event 408 in announcement 446.

The user experience for the embodiment illustrated in FIG. 4 is that the listeners of the stream from each GVA may hear different specific information about the events than the listeners of the streams from the other GVAs. However, all of the listeners will receive the complete information that four people have joined the conference.

Figure 5:
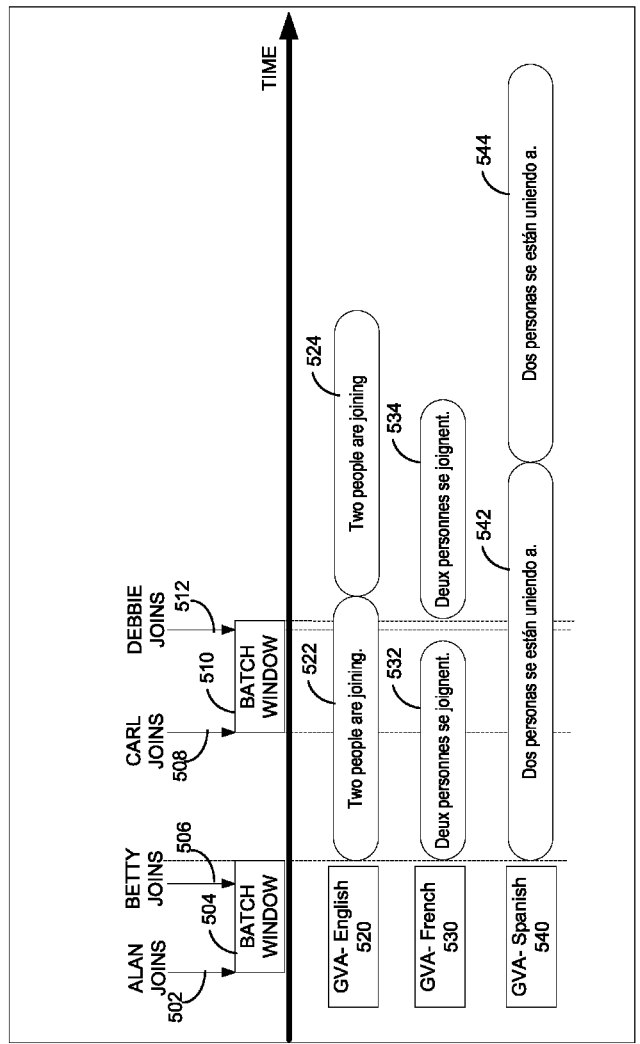
FIG. 5 illustrates a third example of a set of announcement events.

FIG. 5 illustrates a diagram 500 of an example of a series of announcement events for a conference according to an embodiment. In the example in FIG. 5, conference announcement module 220 may batch attendance changes according to both a time window and while an announcement is taking place. Conference announcement module 220 may have three GVAs, for three different languages: GVA-English 520, GVA-French 530, and GVA-Spanish 540. In an embodiment, conference announcement module 220 may maintain a separate portion within batch 240 for each GVA, or each GVA may have its own batch.

In the embodiment illustrated by FIG. 5, as in the embodiment in FIG. 3, a first event begins a batch window, as in FIG. 3. In this case, the Alan joins 502 event begins batch window 504. A Betty joins event 506 occurs during batch window 504 and is batched with event 502. When the time for batch window 504 expires, the announcement events 502 and 504 are announced as summary announcements 522, 532 and 542.

While announcements 522 and 542 are still taking place, a new announcement event, Carl joins event 508, occurs. A new batch window 510 is started. A Debbie joins event 512 occurs during batch window 510 and is batched with event 508. Announcement 532 ends before batch window 510 expires. In an embodiment, GVA 530 may wait until batch window 510 expires before making any further announcements. When batch window 510 expires, GVA 530 announces the batched events as a summary announcement 534.

When announcements 522 and 542 end, the batched events are announced as summary announcements 524 and 544.

In other embodiments, a batch window may be created only for the first announcement event during a period when no announcements are taking place. All other announcement events received subsequent to the end of the first batch window may be batched until the end of the currently streaming announcement, as in FIG. 4. In FIG. 5, this would cause announcement 534 to begin as soon as announcement 532 ends, but announcement 534 would only announce the Carl joins event 508.

Figure 6:
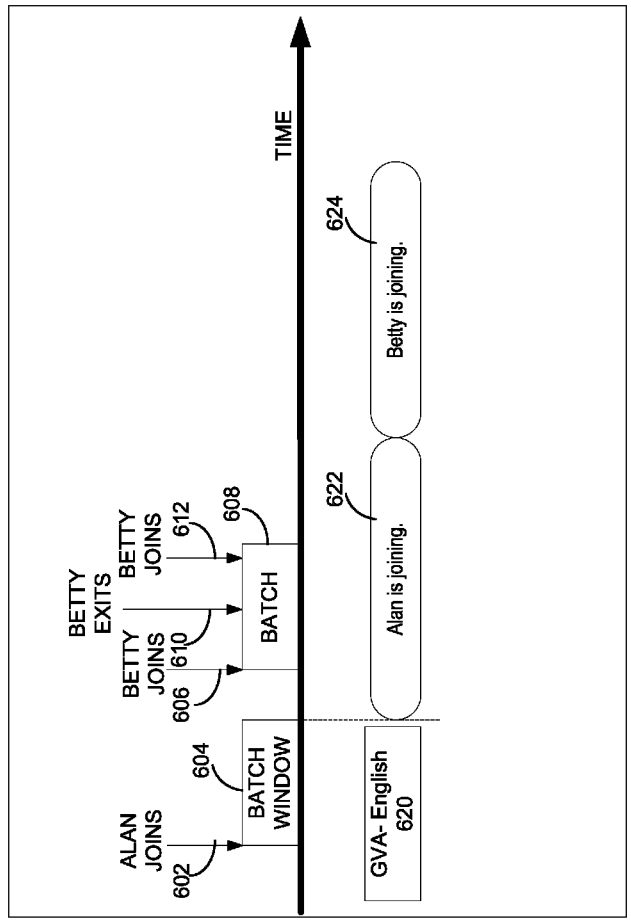
FIG. 6 illustrates a fourth example of a set of announcement events.

FIG. 6 illustrates a diagram 600 of an example of a series of repeating announcement events for a conference according to an embodiment. A repeating announcement event may refer to a series of entry and exit events for a single participant. This may occur when a participant has an unstable network connection, for example. Having each entry and exit announced may be disruptive and unnecessary. In the example in FIG. 6, conference announcement module 220 may batch attendance changes according to both a time window and/or while an announcement is taking place. In FIG. 6, only one GVA 620 is shown, however multiple GVAs are possible.

In FIG. 6, an Alan joins event 602 occurs and begins a batch window 604. When batch window 604 expires, event 602 is announced as announcement 622. When a first Betty joins event 606 occurs, a batch 608 begins. Batch 608 may refer to a batch window, or to a batch for events while an announcement is taking place.

While batch 608 is occurring, a Betty exits event 610 takes place followed by another Betty joins event 512. GVA 620 may detect and suppress the repeating events and may only announce the relevant outcome, in announcement 624. In an embodiment, GVA 620 may detect that there are multiple events for one participant in the batch. GVA 620 may count the number of join events and the number of exit events for that participant, and may announce the kind of event of which there is one more. For example, there are two Betty join events, and only one Betty exits event, so GVA 620 would announce a Betty join event. In another embodiment, GVA 620 may just announce the last event for that participant. In another embodiment, if the events "cancel" each other resulting in no change to the participant's status, for example, an entry and an exit within one batch, GVA 620 may not make an announcement. Suppression of repeating events may take place in any of the embodiments described herein.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 7:
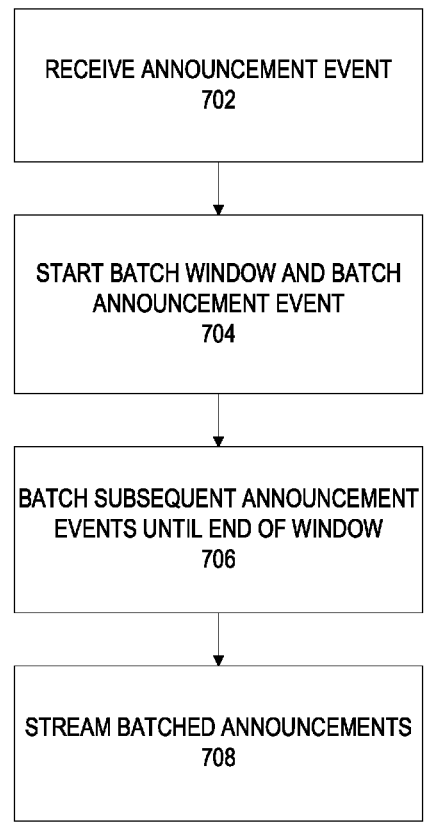
FIG. 7 illustrates an embodiment of a first logic flow.

FIG. 7 illustrates one embodiment of a logic flow 700. Logic flow 700 may be representative of some or all of the operations executed by one or more embodiments described herein. Logic flow 700 may be a representative example of a logic flow followed as shown in FIG. 3.

In the illustrated embodiment shown in FIG. 7, logic flow 700 may receive an announcement event at block 702. For example, conference server 200 may detect that a participant has joined or exited a conference in progress on conference server 200. Conference server 200 may notify the conference announcement module 220 of the event, including the participant's name and what the event was.

Logic flow 700 may start a batch window at block 704 and batch the announcement event received in block 702. For example, conference announcement module 220 may start a batch timer and may place the announcement event into batch 240.

Logic flow 700 may batch subsequently received announcement events, if any, at block 706, until the end of the batch window. For example, while the batch timer has not expired, any announcement events received from conference server 200 may be placed into batch 240, without starting any new batch timers. Additional announcement events may be placed in batch 240 in a sequential manner such that the order of the events is preserved.

In an embodiment, a repeated event, such as a join/exit pair of events for one participant, may be detected within block 706. Pairs of repeated events may be removed from batch 240, or discarded before batching.

Logic flow 700 may stream batched announcement events, if any, at block 708 when the batch window expires. Streaming the batched announcements may include moving or copying the batched events to a processing queue in a group virtual assistant, such as GVA 230. For example, when the batch timer reaches a specified size, e.g. four seconds, conference announcement module 220 may move or copy the events from batch 240 to processing queue 232 in GVA 230. The GVA may construct an announcement according to the number of events in the batch. When only one event is batched, that event may be announced in its entirety, e.g. "Victor is joining". When two or more events are batched, the events may be summarized, for example, as "Three people are joining," or as "Walter and Helen are joining." GVA 230 may announce the batched events as a stream to the conference participants in communication with that GVA.

If other announcement events are received while or after the announcement is streamed in block 708, then blocks 704-708 may be repeated. If a batch window ends before an announcement is finished, then the announcement for the batch window may be delayed until the end of the announcement.

When a conference announcement module 220 has multiple GVAs, each GVA may stream the batched events in its specified language. Conference announcement module 220 may provide each GVA with the events from batch 240, such that each GVA will announce the same event, but in its own language. Thus, in logic flow 700, each GVA will announce the same sequence of single and summary announcement events to the participants.

In an embodiment, a GVA may detect a repeated event before streaming in block 708. For example, a GVA may detect that there are multiple events for one participant within the batch window. The GVA may discard any paired events, such as a join/exit pair and announce only the event that changes the status of the participant during the batch window.

Figure 8:
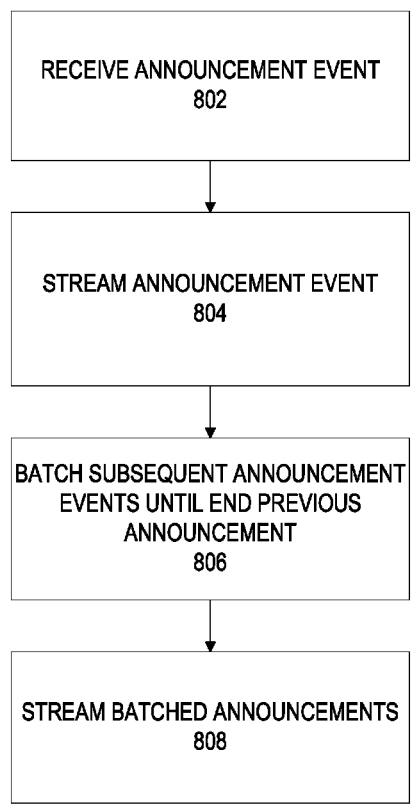
FIG. 8 illustrates an embodiment of a second logic flow.

FIG. 8 illustrates one embodiment of a logic flow 800. Logic flow 800 may be representative of some or all of the operations executed by one or more embodiments described herein. Logic flow 800 may be a representative example of a logic flow followed as shown in FIG. 4.

In the illustrated embodiment shown in FIG. 8, logic flow 800 may receive an announcement event at block 802. Block 802 may be analogous to block 702.

Logic flow 800 may immediately begin streaming the received announcement event at block 804.

Logic flow 800 may batch subsequently received announcement events, if any, at block 806, until the announcement from block 804 finishes. For example, while the announcement received in block 802 is streaming, any announcement events received from conference server 200 may be placed into batch 240. Additional announcement events may be placed in batch 240 in a sequential manner such that the order of the events is preserved.

In an embodiment, a repeated event, such as a join/exit pair of events for one participant, may be detected within block 806. Pairs of repeated events may be removed from batch 240, or discarded before the second pairing event is batched.

Logic flow 800 may stream batched announcement events, if any, at block 808 when the previous announcement is finished. Streaming the batched announcements may include moving or copying the batched events to a processing queue in a group virtual assistant, such as GVA 230. For example, while the announcement is playing, or when the announcement ends, conference announcement module 220 may move or copy the events from batch 240 to processing queue 232 in GVA 230. The GVA may construct an announcement according to the number of events in the batch. When the announcement finishes, GVA 230 may announce the batched events by inserting the announcement into an audio or video stream to the conference participants in communication with that GVA in a manner analogous to block 708.

When a conference announcement module 220 has multiple GVAs, each GVA may stream the batched events in its specified language. Due to the potential differences in the amount of time needed to make an announcement in different languages, each GVA may announce the same events in different ways after the first announcement. If a language results in generally short announcements, more individual announcements may be made as compared to a language where announcements take longer, resulting in more summary announcements. Conference announcement module 220 may provide each GVA with the events from batch 240. Each GVA, however, may consume its processing queue 232 at different rates due to the differences in announcement times. Thus, in logic flow 800, it is possible that each GVA will announce a different sequence of single and summary announcement events to the participants, although overall the information will still be the same concerning the number of participants joining or exiting.

Figure 9:
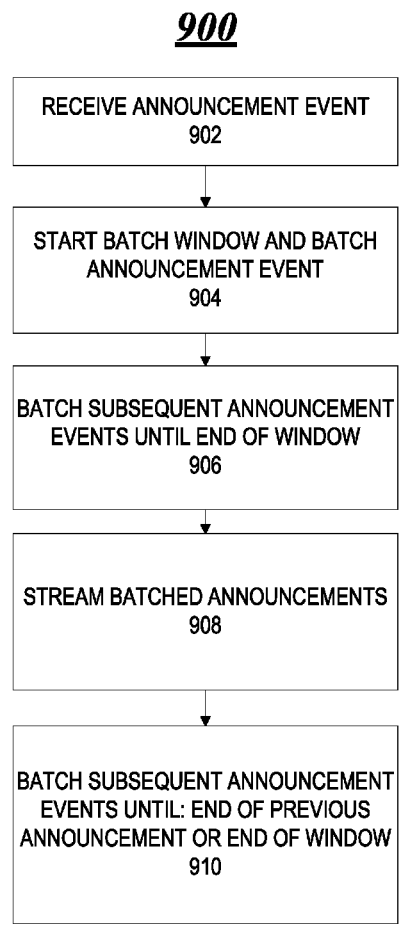
FIG. 9 illustrates an embodiment of a third logic flow.

FIG. 9 illustrates one embodiment of a logic flow 900. Logic flow 900 may be representative of some or all of the operations executed by one or more embodiments described herein. Logic flow 900 may be a representative example of a logic flow followed as shown in FIG. 5.

In the illustrated embodiment shown in FIG. 9, logic flow 900 may receive an announcement event at block 902. Block 902 may be analogous to blocks 702 and 802.

Logic flow 900 may start a batch window at block 904 and batch the announcement event received in block 902. For example, conference announcement module 220 may start a batch timer and may place the announcement event into batch 240.

Logic flow 900 may batch subsequently received announcement events, if any, at block 906, until the end of the batch window. For example, while the batch timer has not expired, any announcement events received from conference server 200 may be placed into batch 240, without starting any new batch timers. Additional announcement events may be placed in batch 240 in a sequential manner such that the order of the events is preserved.

In an embodiment, a repeated event, such as a join/exit pair of events for one participant, may be detected within block 906. Pairs of repeated events may be removed from batch 240, or discarded before batching.

Logic flow 900 may stream batched announcement events, if any, at block 908 when the batch window expires. For example, when the batch timer reaches a specified size, e.g. four seconds, a group virtual assistant, such as GVA 230, may announce the batched events as a stream to the conference participants in communication with that GVA.

Logic flow 900 may batch subsequent announcement events in block 910 that are received while the announcement is streaming in block 908. In an embodiment, the first subsequent announcement event received may begin a new batch window, as in block 904. In another embodiment, the first subsequent announcement event received may be batched with no batch window, as in block 806 of logic flow 800. The announcement events may be batched until either the announcement ends, or until the end of a batch window that began with the first subsequent announcement.

Figure 10:
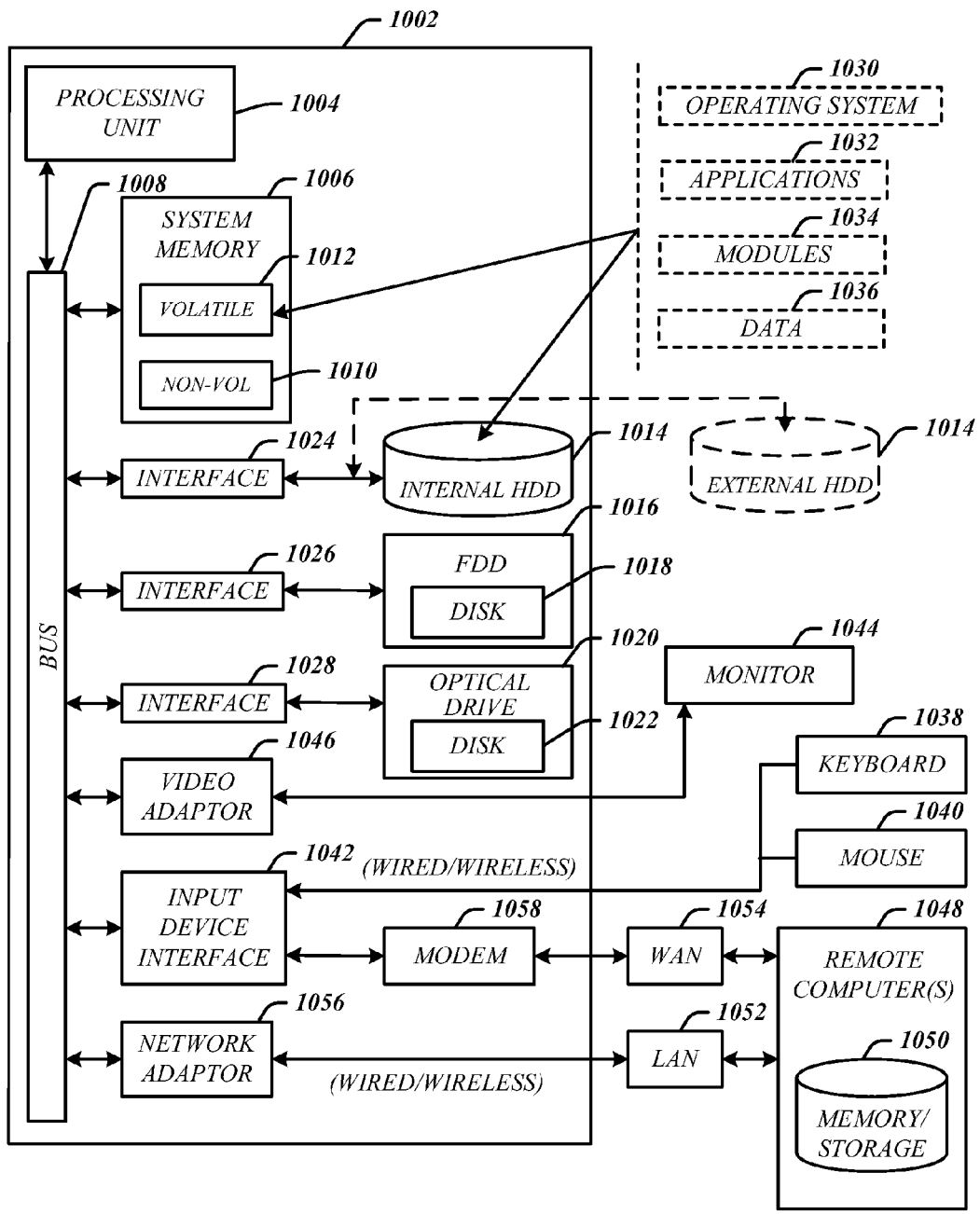
FIG. 10 illustrates an embodiment of a computing architecture.

FIG. 10 illustrates an embodiment of an exemplary computing architecture 1000 suitable for implementing various embodiments as previously described. The computing architecture 1000 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors. Dual microprocessors and other multi-processor architectures may also be employed as the processing unit 1004. The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures.

The system memory 1006 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media, including an internal hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. The one or more application programs 1032, other program modules 1034, and program data 1036 can include, for example, client meeting component 122, server meeting component 210, conference announcement module 220, and group virtual assistance 230.

A user can enter commands and information into the computer 1002 through one or more wire/wireless input devices, for example, a keyboard 1038 and a pointing device, such as a mouse 1040. Other input devices may include a microphone, an infrared (IR) remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 11:
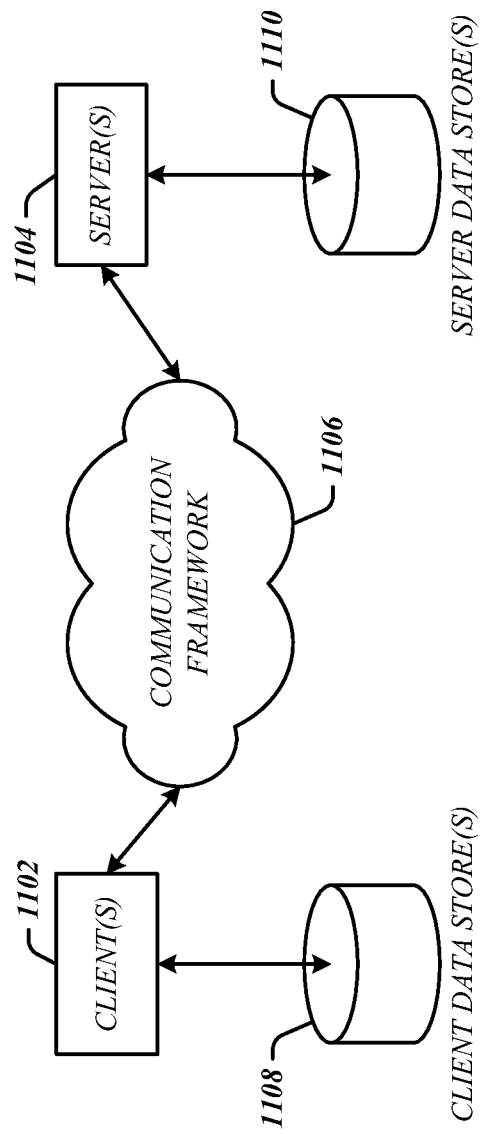
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, and so forth. The embodiments, however, are not limited to implementation by the communications architecture 1100.

As shown in FIG. 11, the communications architecture 1100 comprises includes one or more clients 1102 and servers 1104. The clients 1102 may implement meeting consoles 120. The servers 1104 may implement conference server 110. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement network 130. The communications framework 1106 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 1102 and the servers 1104 may include various types of standard communication elements designed to be interoperable with the communications framework 1106, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 1102 and a server 1104 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
   receiving an announcement event at a conference announcement module for a conference;
   starting a batch time window and batching the received announcement event;
   batching subsequent announcement events until the batch window ends; and
   streaming each subsequent announcement event sequentially when a number of batched announcement events is below a threshold or a summary of batched announcement events when the number of batched announcement events is at or above the threshold, when the batch time window ends, with a group virtual assistant (GVA).

2. The method of claim 1, further comprising:
   streaming an announcement event in a plurality of languages, using a separate GVA for each language.

3. The method of claim 1, further comprising:
   batching announcement events while the GVA is making an announcement.

4. The method of claim 1, wherein an announcement event is one of:
   a participant entry event and a participant exit event.

5. The method of claim 4, further comprising:
   suppressing streaming repeating announcement events within one batch time window.

6. The method of claim 5, wherein a repeating announcement event comprises a pair of a participant entry event and a participant exit event for the same participant.

7. The method of claim 1, further comprising:
   generating at least one of an audio announcement, a video announcement, and a graphical announcement.

8. The method of claim 7, wherein streaming a batched announcement event or a summary of batched announcement events comprises:
   inserting the generated announcement into an audio stream or a video stream for the conference.

9. An article comprising computer-readable storage hardware containing instructions that when executed cause a computing device to:
   stream an announcement event received during a conference using a group virtual assistant (GVA);
   batch subsequent announcement events received while the announcement is streaming; and
   stream each batched announcement event sequentially when a number of batched announcement events is below a threshold or an announcement comprising a summary of batched announcement events, when a previous announcement ends, using the GVA in which the summary comprises one summary announcement event when the number of announcement events is at or above the threshold.

10. The article of claim 9, further comprising instructions that if executed enable the computing device to:
    stream an announcement event in a plurality of languages using a separate GVA for each language.

11. The article of claim 10, further comprising instructions that when executed cause the computing device to provide a separate access point for each GVA to participants of the conference.

12. The article of claim 9, further comprising instructions that when executed cause the computing device to:
    start a batch time window when an announcement event is received;
    batch subsequent announcement events; and
    stream at least one of a batched announcement event or a summary of batched announcement events when the batch time window ends.

13. The article of claim 9, wherein an announcement event comprises at least one of: a participant entry event and a participant exit event, the article further comprising instructions that when executed cause the computing device to:
    suppress streaming a pair of a participant entry event and a participant exit event for the same participant within one batch time window.

14. An apparatus, comprising:
a logic device;
a memory;
a conference announcement module operating on the logic device to:
receive an announcement event for a conference;
start a batch time window and batch the received announcement event;
batch subsequent announcement events received during the batch time window in the memory;
summarize the subsequent announcement events when a number of the subsequent announcement events is at or above a threshold;
stream, from a group virtual assistant (GVA), a summary of batched announcement events when the batch time window ends;
batch subsequent announcement events received while the announcement is taking place;
start a batch time window when a new announcement event is received;
batch the new announcement event and any subsequent announcement events received during the batch time window; and
stream, from the GVA, at least one of each subsequent announcement event sequentially when a number of subsequent announcement events is below the threshold or a summary of batched announcement events when a number of batched announcement events is at or above the threshold.

15. The apparatus of claim 14, the conference announcement module further comprising:
a plurality of GVAs, wherein each GVA makes announcements in a different language; and
the conference announcement module to provide a separate access point for each GVA.

16. The apparatus of claim 15, wherein each GVA is to stream the summary of the batched announcement events when the batch time window ends.

17. The apparatus of claim 14, the GVA to stream a batched announcement event or a summary of batched announcement events by:
generating at least one of an audio announcement, a video announcement, and a graphical announcement; and
inserting the generated announcement into an audio stream or a video stream for the conference.

18. The apparatus of claim 14, wherein an announcement event comprises at least one of: a participant entry event and a participant exit event, the conference announcement module operating on the logic device further to:
suppress streaming a pair of a participant entry event and a participant exit event for the same participant within one batch time window.

* * * * *